Figures 1, 2:
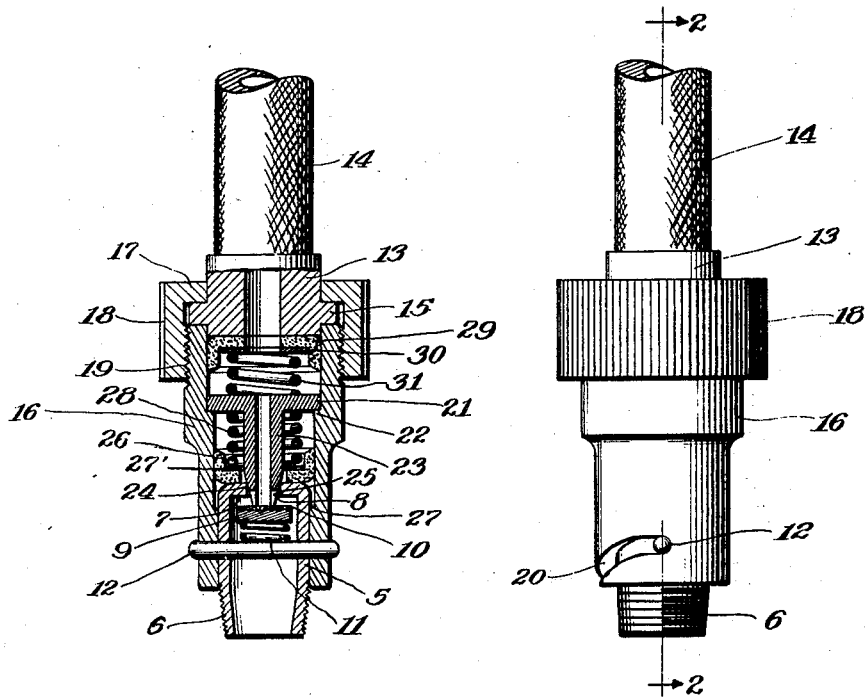

March 24, 1931.   E. F. PIERCE   1,797,363
COUPLING
Original Filed Aug. 6, 1923

Inventor
Earl F. Pierce
By Pierce & Swet
Attys.

Patented Mar. 24, 1931

1,797,363

UNITED STATES PATENT OFFICE

EARL F. PIERCE, OF WINNETKA, ILLINOIS, ASSIGNOR TO ALEMITE CORPORATION, OF CHICAGO, ILLINOIS, A CORPORATION OF DELAWARE

COUPLING

Original application filed August 6, 1923, Serial No. 655,919. Divided and this application filed March 29, 1926. Serial No. 98,199.

My invention relates to improvements in couplings, and is particularly concerned, though not necessarily limited to improvements in couplings forming parts of lubricating systems.

The objects of my invention are:

First, to provide a coupling comprising a fitting, or element, adapted to be secured to a bearing, or connected with a source of fluid under pressure, and a co-acting coupling member that may either conduct lubricant to, or receive lubricant from the fitting, or that may be used for conducting any other desired fluid.

Second, to provide a construction such as described, in which one of the coupling members is provided with a valve that is normally subjected to the pressure of the fluid conducted when the valve is in its closed position, and the other coupling member is provided with means for opening said valve to permit the passage of fluid from the valve coupling member to the other coupling member.

Third, to provide a coupling such as described, comprising means for sealing the connection between the two coupling members before the valve in the one coupling member is opened; and Fourth, to provide a coupling such as described, that is simple in construction, economical to manufacture and easy to operate.

Other objects of my invention will appear as this description proceeds, reference being had to the accompanying drawings, in which Figure 1 is a side elevation of my improved coupling; and Figure 2 is a central longitudinal section therethrough on line 2—2 of Figure 1.

The embodiment of my invention disclosed herein comprises a cylindrical fitting 5, one end of which is screw threaded at 6 to enable it to be connected with a bearing, or any other conduit. The inner end of this fitting, or coupling member, is flanged inwardly as shown at 7 to provide the opening 8, and a valve seat for the valve comprising the metal disc 9 and the leather disc 10. These two discs are yieldingly urged toward the outer end of the fitting by means of the compression spring 11, one end of which engages the inner face of the metal disc 9, and the other end of which rests upon the cross pin 12 extending through and beyond the sides of the fitting.

The other coupling member of my improved coupling comprises a swivel member 13 that may be suitably connected with a flexible conduit 14, or any other type of conduit. The swivel element 13 comprises an annular flange 15 that is clamped between one end of the sleeve 16 and the inturned flange 17 of the sleeve 18. The two sleeves 16 and 18 are threaded together as shown at 19. It will, of course, be understood that the contact between the annular flange 15 and the adjacent portions of the sleeve 16 and the flange 17 is not tight enough but what the sleeve 16 can be readily turned upon the swivel element 13.

The outer end of the sleeve 16 is provided with a pair of oppositely disposed bayonet slots 20, only one of which is shown for receiving the ends of the pin 12, and thus establishing a mechanical connection between the two coupling members.

A disc 21 rests against a shoulder 22 formed in the bore of the sleeve 16 and has integrally formed therewith the outwardly extending tube 23. The outer end of the tube is tapered, as shown at 24, so as to permit it freely to enter the opening 8 in the end of the fitting 5 and dislodge the valve, as shown in Figure 2. In order to permit free passage of fluid through the coupling, the outer end of the tube is slotted, as shown at 25.

The annular cup-leather, or gasket, 26 surrounds the tube 23 and normally held against the shoulder 27 by means of a compression spring 28, the opposite end of which engages the outer face of the disc 21. Preferably, a metallic washer 27' is interposed between the outer end of the spring 28 and the bottom of the cup-leather 26.

For the purpose of maintaining a sealed joint between the swivel member 13 and the sleeve 16, I provide a cup-leather, or gasket, 29, in the bottom of which is the washer 30. A spring 31 confined between the washer 30 and the disc 21 holds the former in proper sealing relation with the swivel element 13 and the sleeve 16.

In making a connection between the fitting, or coupling member, 5 and the other coupling member of my invention, the bayonet slots 20 are positioned so as to receive the ends of the pin 12, and the outer coupling member is then turned to bring the cross pin 12 in the position shown in Figure 1. Initially and before the outer end of the tube 23 contacts with the valve in the fitting, the outer face of the gasket 26 contacts with the outer face of the end of the fitting and establishes a sealed connection under the tension of the spring 28. As the sleeve 16 is turned, this sleeve slips down over the fitting 5 thereby increasing the tension of the spring 28 and the seal between the gasket 26 and the fitting. Subsequently to the establishment of the seal between these two elements, the end of the tube 23 engages the leather disc 10 and further movement of the coupling member 16 relatively to the fitting causes the end of the tube 23 to push the valve to the open position shown in Figure 2. The cup leather 26 and its washer 27' fit loosely around the tube 23, so that lubricant can have access to the space in the rear of the cup leather, and inasmuch as the lubricant is under pressure, it will tend to press the cup leather 26 even more tightly against the end of the nipple thereby effectively preventing any leakage of lubricant.

While the coupling described above is adapted to permit flow of liquid through it in either direction, it is particularly suited for use when it is desired to transfer fluid from the fitting to the conduit 14.

This application is a division of my copending application, Serial No. 655,919, filed August 6, 1923.

While I have described the details of the preferred embodiment of my invention, it is to be clearly understood that my invention is not limited to these details, but is capable of other adaptations and modifications within the scope of the appended claims.

Having thus described my invention, what I claim is:

1. A coupling comprising one coupling member and a second coupling member comprising a sleeve having a bore of stepped successively decreasing diameters, an element comprising a disc portion resting on one of the steps in said sleeve and a downwardly projecting tubular portion formed integrally therewith, a valve in said first named coupling member adapted to be opened by said tubular portion upon a coupling operation, and a flexible washer surrounding said tubular portion and engaging the inner wall of said sleeve, said washer subjected to the pressure of the fluid passing through said coupling adapted to seal the connection between said sleeve and said first named coupling member prior to the opening of said valve by said tubular portion.

2. A coupling comprising one coupling member having an inwardly opening valve seating against the outer end thereof, a second coupling member comprising a sleeve for receiving said first-named coupling member, a disc in said sleeve having an outwardly extending open-ended tube formed integrally therewith, the outer end of said tube being positioned to open the valve in said first-named coupling member when said coupling members are coupled together, and an annular gasket loosely surrounding said tube and providing a passageway around said tube for allowing fluid pressure to pass to the rear of said gasket for sealing the connection between said coupling members, said gasket being bodily movable relative to said tube.

3. A coupling comprising one coupling member and a second coupling member comprising a sleeve for receiving said first-named coupling member, a tube in said sleeve having an outer open end, an annular gasket surrounding said tube, and a passageway around said tube communicating with the rear of said gasket, said gasket being movable relative to said sleeve.

4. A coupling comprising one coupling member and a second coupling member comprising an open-ended tube, the outer end of said tube being in communication with said first-named coupling member when said coupling members are coupler together, an annular gasket loosely surrounding said tube, and a passageway around said tube communicating with the rear of said gasket, said gasket being bodily movable relative to said sleeve and said tube.

5. A coupling including a male coupling member and a female coupling member, said female coupling member comprising a sleeve having an internal bore, a disc portion positioned in said bore and having a downwardly projecting nozzle, a valve in said male coupling member adapted to be opened by said nozzle, a flexible cup washer loosely surrounding said nozzle adapted to permit fluid to pass to the rear thereof to force said washer against both the upper end of said male coupling member and also against the inner wall of said femade member, and a spring for forcing said washer against said male coupling member to form a seal prior to the opening of the said valve by said nozzle.

6. A coupling including one coupling member and a second coupling member comprising a sleeve having a bore of stepped successively increasing diameters, an element comprising a disc portion resting on one of the steps in said sleeve, and a downwardly projecting tubular portion formed therewith, a valve in said first-named coupling member adapted to be opened by said tubular portion upon a coupling operation, a flexible washer and a passageway around said tubular portion communicating with the rear of said washer adapted to allow the same to be subjected to the pressure of fluid passing through the coupling to seal the connection there-between.

In witness whereof, I hereunto subscribe my name this 26th day of March, 1926.

EARL F. PIERCE.